United States Patent [19]

Egli

[11] Patent Number: 4,592,656
[45] Date of Patent: Jun. 3, 1986

[54] RING LASER ANGULAR RATE SENSOR WITH MODULATED SCATTERED WAVES

[75] Inventor: Werner H. Egli, Minneapolis, Minn.

[73] Assignee: Honeywell, Inc., Minneapolis, Minn.

[21] Appl. No.: 510,512

[22] Filed: Jul. 5, 1983

[51] Int. Cl.$^4$ ............................................. G01C 19/64
[52] U.S. Cl. ....................................... 356/350; 372/94
[58] Field of Search ........................... 356/350; 372/94

[56] References Cited

U.S. PATENT DOCUMENTS 4,410,276  10/1983  Ljung et al. ........................ 356/350

Primary Examiner—Vincent P. McGraw
Attorney, Agent, or Firm—Robert A. Pajak

[57] ABSTRACT

The present invention provides a method and apparatus applicable to ring lasers for modulating scattered waves reflected from the mirrors which define the ring laser optical closed-loop path in such a way to reduce the average error produced by lock-in effects to low levels approaching an average of zero.

15 Claims, 2 Drawing Figures

RING LASER ANGULAR RATE SENSOR WITH MODULATED SCATTERED WAVES

BACKGROUND OF THE INVENTION

This invention relates to ring laser angular rate sensors. In particular, it relates to the avoidance of lock-in in such sensors by moving at least one mirror which defines the ring laser optical closed-loop path in such a manner so as to cause the average error produced by wave scattering effects to be reduced to zero.

Reference is hereby made to U.S. Pat. No. 3,373,650 entitled, "Laser Angular Rate Sensor" and U.S. Pat. No. 3,467,472 entitled, "Random Bias For A Ring Laser Angular Rate Sensor" both by J. E. Killpatrick, and U.S. Pat. No. 3,390,606 entitled, "Control Apparatus" and U.S. Pat. No. 4,152,071 entitled, "Control Apparatus" both by T. J. Podgorski, all of which are assigned to the same assignee as the present application. Reference is also hereby made to a publication entitled, "The Laser Gyro" by Frederick Aronowitz, Laser Applications Vol. 1, 1971.

The references cited above illustrate the principles and problems of ring laser angular rate sensors well known in the art. A ring laser angular rate sensor usually comprises two countertraveling waves or beams in the form of laser beams which propagate about an optical closed-loop path defined by a plurality of wave reflecting means or mirrors. In such sensors there exists a phenomenon known as lock-in which is primarily attributed to wave or light scattering, at the mirrors, of the impinging wave. The light scattering causes the phenomenon known as lock-in which is a major source of angular rate information error produced in such sensors.

In the aforementioned patents, a method known as dithering is utilized to reduce the effects of lock-in. These techniques are well known and have their advantages and disadvantages well known in the art. Such dithering techniques utilize the concept of providing an alternating bias to the frequency difference between the counterpropagating waves. Doing so allows a marked improvement in ring laser angular rate sensors which enhances their capabilities for obtaining low error angular rate information.

BRIEF DESCRIPTION OF THE INVENTION

The present invention provides a method and apparatus applicable to ring lasers for modulating scattered waves reflected from the mirrors which define the ring laser optical closed-loop path in such a way to reduce the average error produced by lock-in effects to low levels approaching an average of zero. In the present invention the scattered waves are modulated at a constant rate and an integer multiples of $2\pi$ radian phase change.

DETAILED DESCRIPTION OF THE INVENTION

Figure 1:
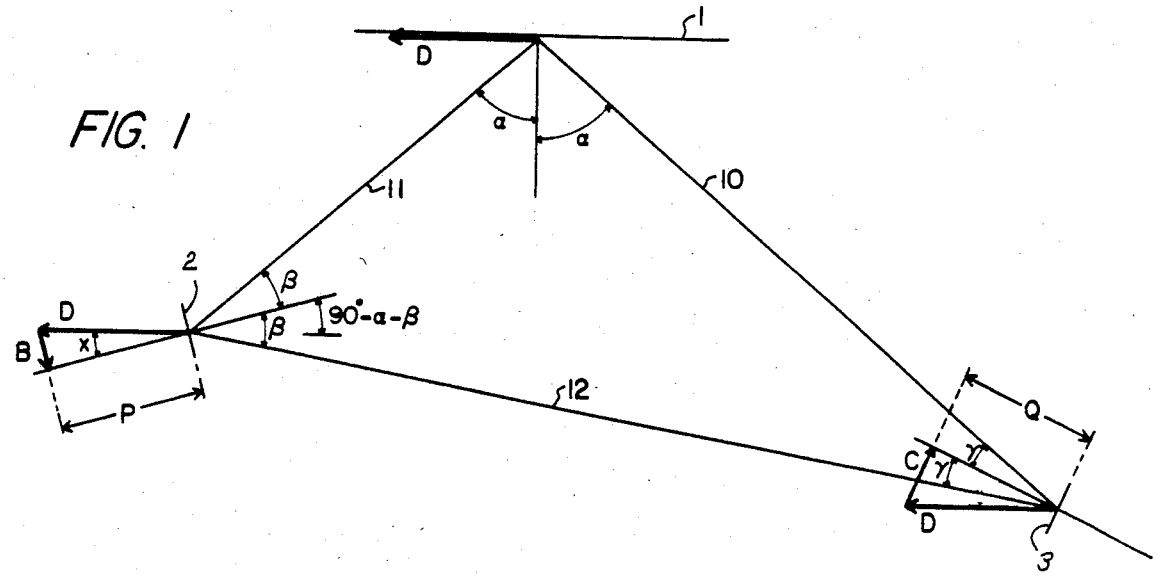
FIG. 1 is a schematic diagram of an optical closed-loop path employed in a ring laser.

Shown in FIG. 1 is a diagrammatic representation of a ring laser optical closed-loop path in the form or a triangle defined by the orientation of mirrors 1, 2, and 3.

As illustrated in FIG. 1, counterpropagating laser beams will travel along the optical closed-loop path along laser beam path segments 10, 11, and 12. Beam segment 10 impinges upon and reflects from mirror 1 at an angle $\alpha$ with respect to the normal to mirror 1; beam segment 11 impinges upon and reflects from mirror 2 at an angle $\beta$ with respect to the normal to mirror 2; and beam segment 12 impinges upon and reflects from mirror 3 an angle $\gamma$ with respect to the normal to mirror 3.

Assume that mirrors 2 and 3 both move to the left, as illustrated in FIG. 1 by a distance D parallel to the surface of mirror 1. Also assume that mirror 2 moves a distance B along a direction parallel to the surface of mirror 2, and mirror 3 moves a distance C along a path parallel to the surface of mirror 3.

Displacement of mirrors 2 and 3 by D causes the impinging laser beam to move a distance D across mirror 1. Simple optics and wave mechanics dictate that the source of backscattered waves reflected from mirror 1 relative to a point on the impinging beam is displaced by a distance, $$\Delta L_1 = 2D \sin \alpha \tag{1}$$

In turn, the phase of the backscattered wave at mirror 1 changes by $$\Delta\phi_1 = \frac{2D}{\lambda} \sin \alpha \tag{2}$$

where $\lambda$ is the wave length of the impinging wave, and $\Delta\phi_1$ is the number of $2\pi$ radian phase changes.

Similarly, the lateral motions B and C of mirrors 2 and 3 generate phasing shifts in the backscattered waves reflected from mirrors 2 and 3 of $$\Delta\phi_2 = \frac{2\beta}{\lambda} \sin \beta \tag{3}$$

$$\Delta\phi_3 = \frac{2c}{\lambda} \sin \gamma \tag{4}$$

If mirror motions of mirrors 2 and 3 are constrained to motion along a path perpendicular to the surfaces of mirrors 2 and 3 respectively, and using simple geometry and trigonometry, the following constraints are defined:

$$\beta = D \sin (90° - \alpha - \beta) = D \sin \gamma \tag{5}$$

$$C = D \sin (90° - \alpha - \gamma) = D \sin \beta \tag{6}$$

With the above constraints, and assuming again that the distance D moved by mirrors 2 and 3 is identical, then $$\Delta\phi_2 = \Delta\phi_3 = \frac{2D}{\lambda} \sin \beta \sin \gamma \tag{7}$$

From equation (2), $$\frac{2D}{\lambda} = \frac{\Delta\phi_1}{\sin \alpha} \tag{8}$$

then $$\Delta\phi_2 = \Delta\phi_3 = \frac{\sin \beta \sin \gamma}{\sin \alpha} \cdot \Delta\phi_1 \tag{9}$$

$$= \frac{T}{1 - T} \Delta\phi_1$$

where $T = \tan\beta \tan\alpha$

Consider now the effect of dithering the mirrors with rapid triangular push-pull motion normal to the surfaces of mirrors 2 and 3. Assume that the push-pull motion is such that the optical path length remains substantially constant similar to that depicted in FIG. 1. If the peak-to-peak amplitude of $\Delta\phi_1$, $\Delta\phi_2$, and $\Delta\phi_3$ can all be made integer multiples of $2\pi$ radians, the backscatter look-in errors will all average to zero as will be subsequently shown.

As is well known, backscatter lock-in errors are sine/cosine functions of the backscattered phase angles as illustrated in the above referred to publication. The modified lock-in equation including modulation of the scattered waves is:

$$\psi = \theta + \Omega_L \sin(\psi + \omega_D t) \tag{10}$$

where
$\theta$    incremental rotation input
$\Omega_L$    lock-in rate
$\psi$    gyro output phase angle
$\omega_D$    triangular modulation of phase of the scattered wave If the backscattered waves are modulated integer multiples of $2\pi$, then $$T = \frac{M}{M + N} \tag{11}$$

where M is the integer multiple of $\Delta\phi_2$ and $\Delta\phi_3$, and N is the integer multiple associated with $\Delta\phi_1$.

Consider now the special case solution where $M=1$ and $N=2$. This selection requires an equilateral triangle where, $$\alpha = \beta = \gamma = 30° \tag{12}$$

and $$T = \tfrac{1}{3} \tag{13}$$

In these circumstances, the push-pull mirror modulations along the normal to mirrors 2 and 3 will have to be $\lambda\sqrt{3}$, peak-to-peak to meet all of the imposed constraints.

The triangular dither frequency of modulating the mirrors should be reasonably high compared with the actual lock-in rate of the sensor. For example, a typical lock-in rate is 90 Hertz ($2\pi$ phase changes/sec.) A typical push-pull mirror dither frequency should then be some reasonable multiple thereof, say 10-fold, or 900 Hertz. If (i) mirrors 2 and 3 are modulated at a constant rate, and if (ii) the phase modulation of the scattered waves is an integer multiple of $2\pi$ radians, the average error rate becomes zero.

If mirrors 2 and 3 are modulated at a constant rate so as to provide a constant phase change rate $\omega$, and for a time interval $\omega t = 0$ to $2\pi$, the average composite error rate for mirrors 2 and 3 becomes:

$$\langle \dot{E} \rangle = \frac{-\Omega_L^2}{2\omega} \tag{14}$$

The average error rate for mirror 1 being one-half that of equation (15) because the phase rate change of mirror 1 is twice the $\omega$ rate due to modulation of mirrors 2 and 3. With triangular modulation, $\omega$ switches back and forth between plus and minus $\omega$. Hence, the average value of the error is reduced to zero over a complete dither cycle or dither modulation of the phase of the backscattered waves. This gives an effective zero bias effect and thus zero lock-in error.

In practice of the invention, mirrors 2 and 3 are modulated perpendicular to their respective surface sufficient to move mirrors by a displacement D to meet the above necessary constraints. In order for mirror 2 to move by D, mirror 2 must be moved a distance D $\cos\gamma$, similarly mirror 2 must be moved D $\cos\beta$. The value of D is determined from modified equation (2) by the expression:

$$D = \frac{N 2\pi \lambda}{2 \sin\alpha} \tag{15}$$

Figure 2:
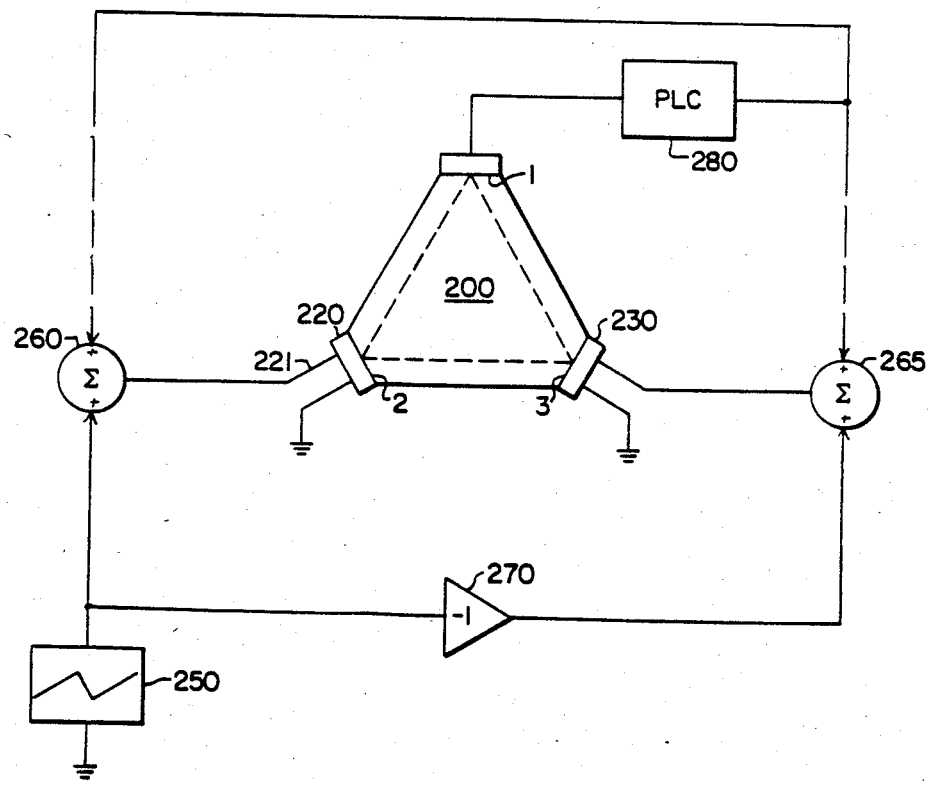
FIG. 2 is a schematic block diagram showing one embodiment of the invention.

FIG. 2 is a block diagram showing an implementation of the invention of the present application. There shown is a ring laser angular rate sensor 200 having mirrors 1, 2, and 3. Mirror 2 is coupled to transducer 220 and mirror 3 is coupled to transducer 330. Transducer 220 has a control input 221 electrically connected to signal means 250 through summing means 260. Transducing means 330 has a control input electrically connected to signal means 250 through summing means 265 and inverting means 270.

Signal means 250 provides a triangular wave signal which is presented to transducing means 220 and 230 for modulating mirrors 2 and 3 respectively along a path perpendicular to the surfaces thereto. Inverter means 270 inverts the signal provided by signal means 250 so that mirrors 2 and 3 vary in position in opposite sense so as to substantially maintain the optical path length constant. (Inverter means 270 could be eliminated by an appropriate arrangement of electrical connections between transducer 230 and signal means 250.)

It is desirable to maintain the path length constant through a more precise path length control means 280 for providing average position control of mirrors 2 and 3 through transducing means 220 and 230 respectively. As illustrated in FIG. 2, the path length control means 280 provides a signal input to transducing means 230 through summing means 265 which sums the output of path length control means 280 and the output of inverting means 270. Similarly, the output of path length control means 280 is provided to transducing means 220 through summing means 260.

In operation, path length control means 280 varies the average position of mirrors 2 and 3 through a feedback control system well known in the art. Usually, path length control means 280 is responsive to beam intensity of at least one of the counterpropagating laser beams of sensor 200. Signal means 250 provides a triangular wave signal of sufficient amplitude to modulate the positions of mirrors 2 and 3 to phase modulate the backscattered waves an integer multiple of $2\pi$ radians in a manner as already described.

There are, of course, many modifications which may be made to the invention as presented. Although the invention of the present application has been shown particularly with a triangular shaped ring laser angular rate sensor, the principles of the present application may be applied to other forms.

The embodiments of the invention in which an exclusive property or right is claimed are defined as follows:

1. A ring laser angular rate sensor comprising:
   means for producing two counterpropagating waves traveling in opposite directions about an optical closed-loop path defined by a plurality of mirrors; and
   first means for alternately advancing and retarding, at substantially a constant rate, the phase of backscattered waves reflected from a first one of said plurality of mirrors an integer number of $2\pi$ radians.

2. The sensor of claim 1 further comprising second means for alternately advancing and retarding, at substantially a constant rate, the phase of backscattered waves reflected from a second one of said plurality of mirrors an integer multiple of $2\pi$ radians.

3. The sensor of claim 2 further comprising path length control means responsive to at least one of said waves for maintaining said optical closed-loop path substantially constant.

4. The sensor of claim 2 wherein said optical closed-loop path is in the form of a triangle.

5. The sensor of claim 2 further comprising:
   first transducing means coupled to said first mirror, said first transducing means having a control signal input for controlling the position of said first mirror; and
   signal means for providing a first control signal presented to said first transducing means control signal input, said first control signal being a triangular wave signal of sufficient peak-to-peak amplitude to phase modulate said backscattered waves reflected from said first mirror a first integer number of $2\pi$ radians at substantially a constant rate.

6. The sensor of claim 5 further comprising:
   second transducing means coupled to said second mirror, said second transducing means having a control signal input for controlling the position of said second mirror; and
   said signal means being further capable of providing a second control signal presented to said second transducing means control signal input, said second control signal also being a triangular wave signal of sufficient peak-to-peak amplitude to phase modulate the backscattered waves reflected from said second mirror a second integer number of $2\pi$ radians at substantially a constant rate.

7. The sensor of claim 6 wherein said first and second integers are selected so that the phase of backscattered waves at each of said plurality of mirrors is modulated an integer multiple of $2\pi$ radians.

8. The sensor of claim 6 further comprising path length control means responsive to at least one of said waves for providing a path length control signal to at least said first transducing means control signal input for controlling the average position of said first mirror so as to maintain a constant path length.

9. The sensor of claim 6 wherein said first and second integers are equal and said optical closed-loop path is in the form of a triangle.

10. The sensor of claim 9 wherein said first and second transducing means and said signal means are arranged so as to vary the position of said first and second mirrors in an opposite sense but equal in magnitude and along paths perpendicular to the surfaces of said first and second mirrors, respectively, so as to maintain said optical closed-loop path substantially constant.

11. A method of minimizing lock-in error in a ring laser angular rate sensor having three mirrors defining an optical closed-loop path in the form of a triangle and including laser means for producing two counterpropagating laser beams traveling in opposite directions along said triangular closed-loop path, said method comprising:
   phase modulating, at a constant rate, backscattered waves reflected from a first one of said three mirrors an integer number of $2\pi$ radians; and
   phase modulating, at a constant rate, backscattered waves reflected from a second one of said three mirrors an integer number of $2\pi$ radians so that the phase of backscattered waves reflected from a third one of said three mirrors is phase modulated an integer multiple of $2\pi$ radians.

12. A method of minimizing lock-in error in a ring laser angular rate sensor having three mirrors defining an optical closed-loop path in the form of a triangle and including laser means for producing two counterpropagating laser beams traveling in opposite directions along said triangular closed-loop path, said method comprising:
   modulating the position of a first one of said three mirrors, back and forth by a first amplitude along a path substantially perpendicular to said first mirror, at a constant rate, to phase modulate backscattered waves reflected from said first mirror a first integer multiple of $2\pi$ radians, while modulating the position of a second one of said three mirrors back and forth by a second amplitude along a path substantially perpendicular to said second mirror, at a constant rate, to phase modulate backscattered waves reflected from said second mirror a second integer multiple of $2\pi$ radians.

13. The method of claim 12 wherein said position of said first and second mirrors are modulated substantially equal in amplitude, synchronously, and in an opposite sense so as to maintain a substantially constant optical path length.

14. The method of claim 13 wherein said first and second amplitudes are selected so as to cause phase modulation of backscattered waves reflected from a third one of said three mirrors an integer number of $2\pi$ radians.

15. The method of claim 14 wherein said first and second integer multiples are equal.

* * * * *